United States Patent
Kroth et al.

(10) Patent No.: US 7,860,510 B2
(45) Date of Patent: Dec. 28, 2010

(54) METHOD FOR CONTROLLING DATA TRANSMISSION IN A RADIO COMMUNICATION SYSTEM WITH A HIERARCHICAL NETWORK ARCHITECTURE

(75) Inventors: Norbert Kroth, Potsdam (DE); Jörg Schniedenharn, Bonn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/519,923

(22) PCT Filed: Jul. 1, 2003

(86) PCT No.: PCT/EP03/07009

§ 371 (c)(1),
(2), (4) Date: Jan. 3, 2005

(87) PCT Pub. No.: WO2004/006607

PCT Pub. Date: Jan. 15, 2004

(65) Prior Publication Data

US 2005/0239460 A1    Oct. 27, 2005

(30) Foreign Application Priority Data

Jul. 3, 2002   (DE) ............... 102 29 896
Jul. 3, 2002   (EP) ............... 02014722

(51) Int. Cl.
*H04W 72/00*     (2009.01)

(52) U.S. Cl. ........... 455/453; 455/449; 455/450; 455/422.1; 455/436; 370/328; 370/331

(58) Field of Classification Search ......... 455/436–437, 455/449, 452.2, 453, 500, 507, 446, 450, 455/561; 370/229, 331–333, 338
See application file for complete search history.

(56) References Cited

U.S. PATENT DOCUMENTS

| | | | | |
|---|---|---|---|---|
| 5,490,087 A | * | 2/1996 | Redden et al. | ............... 455/427 |
| 5,912,884 A | * | 6/1999 | Park et al. | ..................... 370/331 |
| 6,129,604 A | * | 10/2000 | Maveddat et al. | ........... 455/453 |
| 6,292,667 B1 | * | 9/2001 | Wallentin et al. | ........... 455/458 |
| 6,360,106 B1 | * | 3/2002 | Besson | ....................... 455/561 |
| 6,400,954 B1 | * | 6/2002 | Khan et al. | .................. 455/450 |
| 6,553,227 B1 | * | 4/2003 | Ho et al. | ..................... 455/433 |
| 6,553,233 B1 | * | 4/2003 | Lee et al. | ..................... 455/446 |
| 6,560,460 B1 | * | 5/2003 | Horneman et al. | ........ 455/452.2 |
| 6,577,871 B1 | * | 6/2003 | Budka et al. | ................. 455/453 |

(Continued)

FOREIGN PATENT DOCUMENTS

DE     199 13 086 A1     10/2000

(Continued)

OTHER PUBLICATIONS

Abstract of Japanese Patent Publication No. 2001251658, Sep. 2001.

*Primary Examiner*—Sharad Rampuria
(74) *Attorney, Agent, or Firm*—Staas & Halsey LLP

(57) ABSTRACT

The transmission of data is controlled in a radio communication system having a hierarchical network structure. A low-hierarchy device transmits load-based signalling to a high-hierarchy device and the high-hierarchy device caries out control of the transmission capacities of the low-hierarchy device based on the load-based signalling.

13 Claims, 1 Drawing Sheet

U.S. PATENT DOCUMENTS

| | | | |
|---|---|---|---|
| 6,671,259 B1 * | 12/2003 | He et al. | 370/238 |
| 6,728,237 B2 * | 4/2004 | Helander | 370/352 |
| 6,738,625 B1 * | 5/2004 | Oom et al. | 455/453 |
| 6,792,275 B1 * | 9/2004 | Lo et al. | 455/452.2 |
| 6,912,390 B2 * | 6/2005 | Andersson et al. | 455/436 |
| 6,934,525 B1 * | 8/2005 | Dunlop et al. | 455/403 |
| 6,968,192 B2 * | 11/2005 | Longoni | 455/453 |
| 7,024,203 B1 * | 4/2006 | Naghian | 455/453 |
| 7,317,917 B2 * | 1/2008 | Qian et al. | 455/432.1 |
| 7,321,926 B1 * | 1/2008 | Zhang et al. | 709/220 |
| 7,570,956 B2 * | 8/2009 | Bigham et al. | 455/453 |
| 7,580,716 B2 * | 8/2009 | Ransom et al. | 455/453 |
| 2002/0021692 A1 | 2/2002 | Huh et al. | |
| 2002/0193118 A1 * | 12/2002 | Jain et al. | 455/453 |
| 2003/0112752 A1 * | 6/2003 | Irifune et al. | 370/229 |
| 2005/0148337 A1 * | 7/2005 | Karlsson et al. | 455/453 |

FOREIGN PATENT DOCUMENTS

| | | |
|---|---|---|
| DE | 199 50 858 A1 | 5/2001 |
| EP | 1081979 | 3/2001 |
| EP | 1 180 908 | 2/2002 |
| JP | 4-323921 | 11/1992 |
| JP | 5-183489 | 7/1993 |
| JP | 10-51836 | 2/1998 |
| JP | 11-75264 | 3/1999 |
| JP | 2001-36939 | 2/2001 |
| WO | 00/35226 | 6/2000 |
| WO | WO 01/17307 | 3/2001 |
| WO | 01/76304 | 10/2001 |

\* cited by examiner

METHOD FOR CONTROLLING DATA TRANSMISSION IN A RADIO COMMUNICATION SYSTEM WITH A HIERARCHICAL NETWORK ARCHITECTURE

CROSS REFERENCE TO RELATED APPLICATIONS

This application is based on and hereby claims priority to German Application No. 102 29 896.3 filed on Jul. 3, 2002 and European Application No. 02014722.9 filed on Jul. 3, 2002, the contents of which are hereby incorporated by reference.

BACKGROUND OF THE INVENTION

Field of the Invention

The present invention relates to a method for controlling a transmission of data in a radio communication system with a hierarchical network architecture and user equipment. The entire radio communication system thus has two basic components. On one side user equipment is provided which is the start point or end point of data connections in the radio communication system. The user equipment can be embodied as stationary, fixed user equipment or also as mobile user equipment. On the other side a network architecture is provided made up of hierarchically structured network devices which exchange data with the user equipment via a radio interface. The devices of the hierarchical network architecture can likewise be embodied as stationary, fixed devices or also as mobile devices. Radio communication systems can even be provided in which devices can act as both user equipment and as devices of the hierarchical network architecture, for example in the case of a decentralized ad-hoc network.

This type of hierarchical network architecture means that the network architecture features devices of different hierarchy levels, with devices of the higher hierarchy being assigned certain control and checking tasks over devices of the lower hierarchy. In such radio communication systems all types of data transmission can basically be provided, i.e. signaling data or payload data such as voice data, multimedia data or similar, for example the transmission of packet data.

Radio communication systems with hierarchical network architecture are sufficiently known from the related art. Thus U.S. 2002/0021692 for example describes a mobile telecommunications system designed for packet data transmission. This patent especially describes a method for High Data Rate (HDR) packet data transmission as will be standardized within the framework of the 3rd Generation Partnership Project 2 Organization (3GPP2). In particular this describes the control of packet data transmission between an Access Network (AN) and an Access Terminal (AT) which occurs as a function of the signaling on a Reverse Link between the Access Terminal (AT) and the Access Network (AN), that is as a function of the signaling on the air interface. Within the framework of this document the intention is to specifically optimize the load on the Reverse Link, i.e. between a hierarchical network architecture and user equipment (terminal).

SUMMARY OF THE INVENTION

An object of the present invention is thus to provide an option for controlling a transmission of data in a radio communication system with a hierarchical network architecture and user equipment.

The invention is directed to a method for controlling a transmission of data in a radio communication system with a hierarchical network architecture and user equipment. In accordance with the invention there is now provision for a device of a lower hierarchy of the hierarchical network architecture to transfer cell load reporting signals to a device of a higher hierarchy of the hierarchical network architecture and for the device of the higher hierarchy to control transmission capacities of the device in the lower hierarchy based on the cell load reporting. In this way the device in the higher hierarchy receives information which is based on the data load present at a corresponding device in the lower hierarchy. The device of the higher hierarchy can then adapt the checking and/or control of the lower hierarchy device specifically to control of the transmission capacities of lower hierarchy devices based on this information. This method is thus especially advantageous for those radio communication systems in which the standard signaling between the different hierarchy levels is designed so that the device of the higher hierarchy has only restricted knowledge or no knowledge about operational relationships to devices of lower hierarchies, specifically about such operating relationships which have a particular relationship with the data load at the corresponding device of the lower hierarchy.

A further development of the present invention provides for specific information about the load states for the area of the radio communication system served by the device of the lower hierarchy to be transferred as cell load reporting. Thus in this special case the information transmitted is that which gives direct details of the load states at the device in the lower hierarchy. This gives the device in the higher hierarchy direct knowledge about these load states at the device in the lower hierarchy.

In particular provision can be made for load values averaged over time for defined parameters to be provided as information about the load states and/or signaling types of the radio communication system for radio data connections between a device of the lowest hierarchy and user equipment. Such defined operating parameters and/or signaling types can for example be the average utilization of physical transmission capacities, the average use of specific types of modulation, the average number of transmissions of selected signaling, the average occupancy times of data buffers etc. The averaging over time ensures that precisely for cases of load values which change significantly over time, a load value determined as just a one-off and short-term value does not affect the further execution sequences in the radio communication system.

The cell load reporting can be used to optimize a wide diversity of execution sequences within the hierarchical radio communication system. There can also be provision for example for individual devices of the same hierarchy to exchange information with each other about the corresponding cell load reporting, so devices of higher hierarchies also receive load-based information from devices of lower hierarchies not directly assigned to them.

The load-based signaling especially provides devices of the higher hierarchy with a knowledge of the load situation and load distribution at assigned devices of the lower hierarchy. For example an optimization or equalization of the load situation can then be initiated by a device at a higher hierarchy at individual assigned devices of the lower hierarchy. Thus provision can be made in particular for an assignment of user equipment to particular devices of the lowest hierarchy to be checked on the basis of cell load reporting. Since in accordance with the invention a device of a higher hierarchy has an overview of the utilization situation at the assigned devices of the lower hierarchy, the device of the higher hierarchy at least makes proposals for a changed assignment of terminals to specific devices of the lower hierarchy or the device of the higher hierarchy can directly initiate a changed assignment of terminals to specific devices of the lower hierarchy.

A specific further development of the method just described can be implemented when a cellular radio communication system is provided as the radio communication system. A check can then be made on the basis of load-based signaling of a handover option for at least one terminal of a first cell of the radio network into a second cell of the radio communication system. The methods for subsequent execution of such a handover for terminals in a cellular radio communication system are basically sufficiently well known from the related art and need not be described in further detail here.

The cell load reporting can be transmitted from the lower hierarchy device to the higher hierarchy device as a function of various events. Thus provision can be made for example for the cell load reporting to be transmitted depending on specific timing events. Either discrete, defined points in time can be defined as time events or the sequence of defined time intervals can be defined as the time event. Provision can be made as a special case for the cell load reporting to be transmitted periodically, that is after consecutive identical time intervals have elapsed in each case.

As an alternative there can also be provision for the cell load reporting to be transmitted as a function of specific operating events of the radio communication system. Thus for example the cell load reporting can be undertaken as a function of defined load states for the area of the radio communication system served in the lower hierarchy. Basically any other operating events can also be defined which initiate a cell load reporting. Thus the cell load reporting can for example also be linked to specific signaling within the radio communication system.

As a special case of the method provision can be made for the cell load reporting to be undertaken depending on defined threshold values for the load states. Cell load reporting can therefore be undertaken if predefined threshold values are exceeded or undershot for defined load states. The operating parameters already mentioned and/or signaling types of the radio communication system can be used as defined load states, as can the utilization of physical transmission capacities, the use of particular types of modulation etc.

The method in accordance with the invention can basically be applied to all suitable types of radio communication system which feature a hierarchically-structured network architecture. The method can be used especially advantageously for control of a transmission of data packets in a packet data transmission system.

A further object of the present invention is a radio communication system with a hierarchical network architecture with devices for controlling a data transmission and with user equipment. Here the hierarchical network architecture features lower-hierarchy devices and at least one higher-hierarchy device. There is provision according to the present invention for at least one lower-hierarchy device to be embodied for transmission of cell load reporting to a higher-hierarchy device and for the higher-hierarchy device to be embodied for control of transmission capacities of the lower-hierarchy devices on the basis of the cell load reporting.

The advantages of this inventive radio communication system are obtained in a similar manner to that of the inventive method already described. The individual devices of the inventive radio communication system can also be developed and adapted to make them suitable for executing one part or all of the above-mentioned inventive method.

Basically any suitable type of radio communication system can be provided as the radio communication system. Preferably the radio communication system can be embodied as a packet data transmission system.

BRIEF DESCRIPTION OF THE DRAWINGS

These and other objects and advantages of the present invention will become more apparent and more readily appreciated from the following description of a specific exemplary embodiment, using a radio communication system for packet data transmission as an example, taken in conjunction with the accompanying drawings of which.

DETAILED DESCRIPTION OF THE PREFERRED EMBODIMENT

Figure 1:
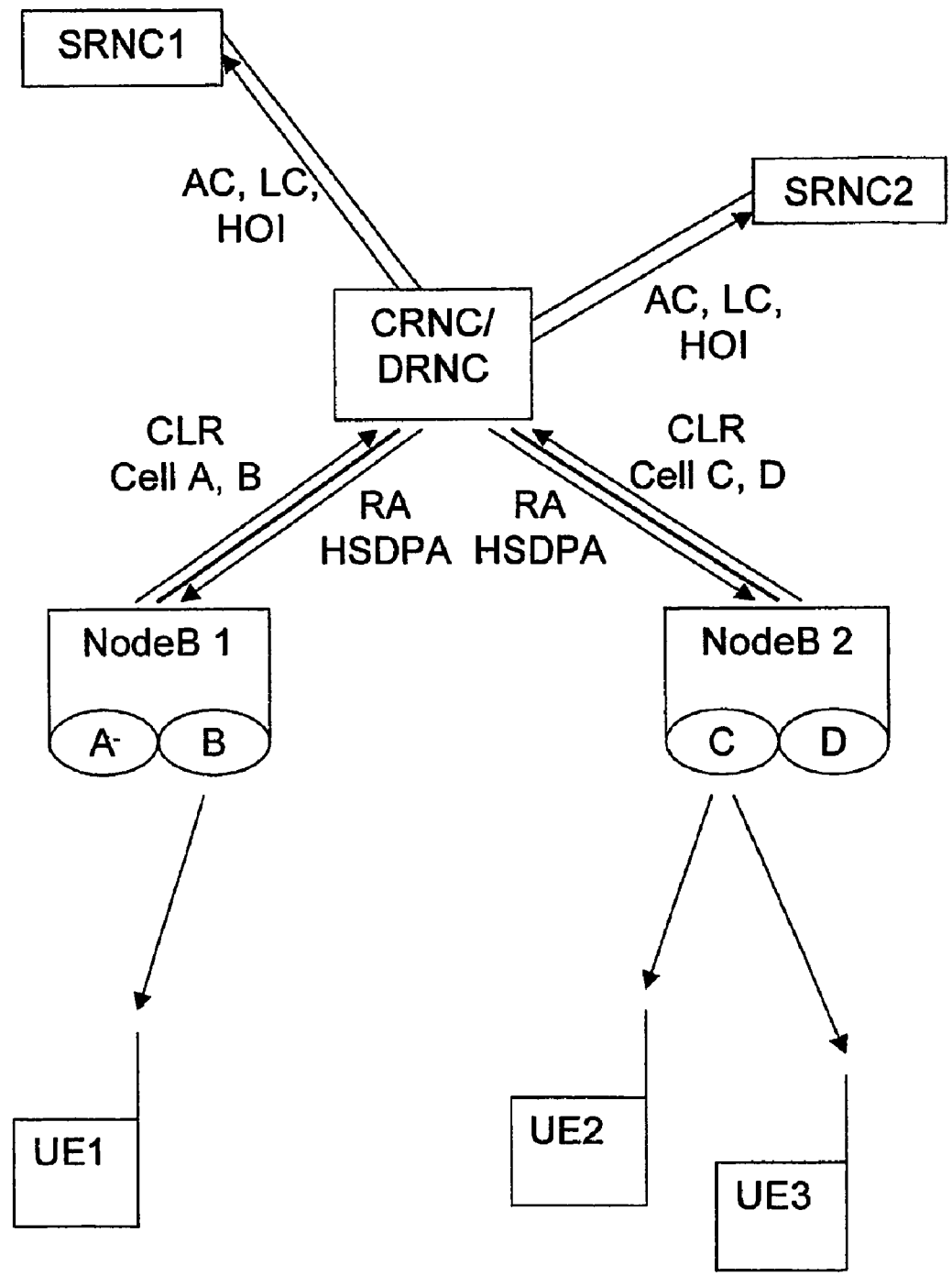
FIG. 1 is a schematic diagram of a radio communication system for packet data transmission.

Reference will now be made in detail to the preferred embodiments of the present invention, examples of which are illustrated in the accompanying drawings, wherein like reference numerals refer to like elements throughout.

FIG. 1 shows a block schematic of the most important components of a radio communication system for packet data transmission. The 3GPP organization already mentioned at the start basically specifies methods designed to allow efficient packet data transmission to user equipment. One component of the methods is for example an adaptive modulation and a time-based scheduling of physical resources in a base station (also referred to within the framework of a packet data transmission as NodeB, cf. FIG. 1), that is in a device of the lowest hierarchy of a radio communication system for packet data transmission. The methods are also referred to as "High Speed Downlink Packet Access (HSDPA)" where downlink indicates the transmission of packet data in the downstream direction from a base station to a UE (User Equipment).

There is provision within the framework of 3GPP for expanding the area of responsibility and the task area of a base station NodeB in comparison to normal radio communication systems. In this case the base stations NodeB are given the sole responsibility of controlling the transmission capacities, i.e. physical resources assigned to them, for a packet data transmission to user equipment UE on common channels. In this case there can also be signaling between user equipment UE and a base station NodeB for the case of an error in the transmission of packet data on the basis of which the base station NodeB undertakes a retransmission of the incorrectly transmitted data packet. To this end data packets are requested by the base stations NodeB from hierarchically higher devices in the network architecture and stored in first buffers, known as scheduling queues until the transmission of the data packets over the air interface to the user equipment UE is completed. Data packets sent are stored in second data memories, known as retransmission buffers, until such time as the receipt of the data packet from the corresponding user equipment has been positively acknowledged or until a defined send time has been exceeded.

A device of a higher hierarchy of the network architecture of the radio communication system is also shown in FIG. 1, namely as a network node embodied as a switching and control device, a so-called Controlling Radio Network Controller CRNC. This network node CRNC in particular basically has control of transmission capacities—that is over physical resources—of the base stations NodeB 1, NodeB 2 which are subordinate to it in the hierarchy. In a radio communication system there is provision as a rule for a plurality of such network nodes CRNC which may be subordinate to further devices with higher hierarchies in their turn. Thus the network nodes CRNC and the base stations NodeB 1, NodeB 2 connected to them in the data system form a hierarchical network architecture of a radio communication system.

The radio communication system is embodied in the case of FIG. 1 as a cellular radio communication system. The base station NodeB 1 serves a cell A and a cell B, the base station NodeB 2 serves a cell C and a cell D. In the example according to FIG. 1 there is exactly one user terminal UE1 in the cell B, two terminals UE2, UE3 are in the cell C.

For the methods proposed in 3GPP the base stations NodeB 1, NodeB 2 are given the functionality to plan and suitably assign the physical resources for the transmission of data packets to user equipment UE1, UE2, UE3. This planning and assignment of resources can be undertaken by the base stations on the basis of values for the transmission quality or Quality of Service (QoS) for specific current applications in the cell, on the basis of the data rates at the radio interface and/or on the basis of the interference and load situation in the relevant radio cell at that moment. Thus certain control functions are transferred to the base stations which would usually be fulfilled in the centralized network architecture (UTRAN) by the higher ranking network-nodes CRNC. This leads to the problem that the hierarchically higher ranking network node CRNC has only conditional information or no information at all about the current load situation at the base stations NodeB 1, NodeB 2 assigned to it. Thus a network node CRNC could not effectively execute certain checking and control functions which would also be sensible in a hierarchical network architecture, for example admission control and load control.

The above-mentioned problems can, as just shown, occur in a radio communication system for packet data transmission operating in accordance with the HSDPA principle. Basically however comparable considerations can also apply to other hierarchical radio communication systems, as has already been shown at the start of this document. When the HSPDA principle is used in a radio communication system for packet data transmission there is provision on the one hand for the CRNC, when a radio connection to user equipment is established, to release physical resources at the base stations NodeB administered by it (resource allocation for HSDPA, abbreviated in FIG. 1 to RA HSDPA). Without the measures of the invention however the CRNC would not obtain any knowledge about the actual use of the physical resources by the base stations NodeB since a scheduling of the data packets to be transmitted is undertaken in the base stations NodeB. Without the measures of the invention the CRNC would thus have no control over the actual use of the allocated resources in the cells of the radio communication systems subordinate to it.

This is where the invention can help. As shown in FIG. 1, the current load state in the relevant cell A, B, C, D of the base stations NodeB 1, NodeB 2 is reported to the CRNC (Cell Load Reporting CLR for cell A, B or for cell C, D). The load states in the relevant base stations NodeB or in at the relevant cells of the last transmitted directly as cell load reporting. This ensures that even with the use of HSDPA—or basically with comparable problems in hierarchical radio communication systems—the CRNC as a device of a higher hierarchy can continue to exercise sufficient checking and control functions for NodeB devices subordinate to it of the lower hierarchy. Such checking and control functions can for example be an admission control (AC) or a load control (LC).

The cell load reporting CLR of the load states for the cells A, B, C, D can for example be undertaken periodically or event-driven, e.g. if a specific threshold value is exceeded or undershot. The current load states for the cells A, B, C, D can be transmitted as values which represent average values over time for the average usage of signaling or can also represent physical resources which have been assigned for HSDPA. Thus for example the average utilization of the number of code channels, the average use of specific types of modulation, the average occupancy of scheduling queues or the average number of acknowledgement signals (such as HARQ ACQ and NACK) can be included for forming the values for the current load states.

In addition the reported load information can also be used by the CRNC to give another network node SRNC (Serving RNC) a handover indication (HOI) for the purposes of optimizing load distribution in the radio communication system.

The background to this is as follows:

Each network node CRNC can become a Serving RNC (SRNC) for a specific user equipment, if this network node is the first to exercise specific checking functions over specific user equipment UE, since this user equipment UE is currently located in the area of this specific RNC. If the user equipment UE now moves and, in doing so, leaves the area of the SRNC and enters the area of another CRNC, the SRNC retains control over the user equipment UE and the new CRNC merely serves to forward the control actions of the SRNC. The new CRNC is therefore referred to as the Drift RNC (DRNC) for these control actions. Thus if resources are to be allocated for data connections for example to user equipment UE in such a case, the SRNC can no longer control this itself since the user equipment UE is in the area of a DRNC. The SRNC must then request the DRNC to release corresponding resources.

Two SRNCs are shown in FIG. 1 Let us assume that SRNC1 is responsible for controlling user equipment UE1 and SRNC2 for controlling user equipment UE2, UE3. The user equipment UE1, UE2, UE3 however is now located in the area of the CRNC also shown in FIG. 1, which now acts as a DRNC for the user equipment UE1, UE2, UE3 and for the SRNC1 and SRNC2 and the administers the physical resources of the NodeBs assigned to it. The CRNC acting as DRNC can however, as a result of its knowledge of the load circumstances in the cells A, B, C, D or at NodeB 1 and NodeB 2, transfer recommendations to the SRNC1 and SRNC2 in each case such as Handover Indications (HOI) for example.

There is provision in HSDPA for the most recent handover decisions to be made by the corresponding SRNC. Basically handover decisions are made on the basis of the transmission quality for a radio connection to user equipment UE. The load-based handover decision here offers a further opportunity for optimizing the operation of a radio communication system and is of course also applicable in other types of hierarchical radio communication system. An additional option is thus created for making a radio connection (Serving High-speed Downlink Shared Channel HS-DSCH Radio Link) from a first cell into a second cell.

Thus, in the example of FIG. 1 the CRNC, on the basis of the transferred load information CLR of the base station NodeB 2, can send the SRNC2 a handover indication HOI on the basis of which a handover of the radio connection to the user equipment UE3 from cell C into cell D can take place, if in cell C the average usage of certain resources exceeds a defined threshold value. As a further requirement for the execution of such a handover there is usefully provision for this only to occur if, in the new cell, here in the cell D, there are also adequate reception conditions for the terminal UE3. Furthermore the CRNC can also use the load information from the other device of the radio communication system known to it as a basis for rejecting or accepting the desired handover, if this serves to optimize the load situation in the radio communication system.

The following functionalities of the CRNC can also be especially supported by the invention:

a dynamic adaptation of the allocated resources for a transmission of data packets with HSDPA, for example a reduction or increase in the number of codes (channelization codes) used for the transmission, Accepting or rejecting incoming packet data connections Accepting or rejecting a handover Transfer of handover recommendations to SRNCs for optimizing the load situation or using the physical resources in the cells administered by the CRNC.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for controlling transmission of data in a radio communication system having a hierarchical network architecture, comprising:

administering physical resources for a data transmission to user equipment by a first device at a first hierarchy within the hierarchical network architecture, the first device providing a physical radio connection interface to the user equipment; and transmitting load information about a current load situation of the physical resources by the first device to a second device at a second hierarchy higher than the first hierarchy within the hierarchical network architecture for controlling a load distribution.

2. A method according to claim 1, wherein the load information includes load states for an area of the radio communication system supplied by the first device.

3. A method according to claim 2, wherein the load information includes load values averaged over time for at least one of defined operating parameters and signaling types of the radio communication system for radio data connections between user equipment and a third device of a lowest hierarchy.

4. A method according to claim 3, further comprising:
cell load reporting; and
checking on an assignment of user equipment to specific devices of the lowest hierarchy based on said cell load reporting.

5. A method according to claim 4, wherein the radio communication system is a cellular radio communication system, and
wherein said method further comprises checking on a handover option for at least one user equipment from a first cell of the radio communication system to a second cell of the radio communication system based on said cell load reporting.

6. A method according to claim 5, wherein said cell load reporting includes transmissions depending on particular time events.

7. A method according to claim 6, wherein said cell load reporting includes periodic transmissions.

8. A method according to claim 5, wherein said cell load reporting includes transmissions depending on specific operational events its of the radio communication system.

9. A method according to claim 8, wherein said cell load reporting is undertaken as a function of defined load states for the area of the radio communication system served by the first device.

10. A method according to claim 9, wherein said cell load reporting is undertaken as a function of defined threshold values for the load states.

11. A method according to claim 10, further comprising controlling a transmission of data packets in a packet data transmission system.

12. A radio communication system having a hierarchical network architecture with devices for control of transmission of data to user equipment and administration of physical resources, comprising:

at least one high level device at a first hierarchy within the hierarchical network architecture, controlling load distribution of the radio communication system; and at least one low level device at a second hierarchy lower than the first hierarchy, transmitting to said high level device, information about a current load situation of the physical resources administered by said at least one low level device for a data transmission to the user equipment, said high level device controlling the load distribution based on the information, and said low level device providing a physical radio connection interface to the user equipment.

13. A radio communication system according to claim 12, wherein the radio communication system is a packet data transmission system.

* * * * *

UNITED STATES PATENT AND TRADEMARK OFFICE
CERTIFICATE OF CORRECTION

PATENT NO.        : 7,860,510 B2                    Page 1 of 1
APPLICATION NO.   : 10/519923
DATED             : December 28, 2010
INVENTOR(S)       : Norbert Kroth et al.

It is certified that error appears in the above-identified patent and that said Letters Patent is hereby corrected as shown below:

Column 8, Line 21 in Claim 8, after "events" delete "its".

Signed and Sealed this
Twelfth Day of April, 2011

David J. Kappos
*Director of the United States Patent and Trademark Office*